Nov. 29, 1932.  F. A. GARRETT  1,889,470
UNIVERSAL JOINT
Original Filed July 30, 1930  2 Sheets-Sheet 1

Inventor
F. A. Garrett

Nov. 29, 1932.     F. A. GARRETT     1,889,470
UNIVERSAL JOINT
Original Filed July 30, 1930     2 Sheets-Sheet 2

Inventor
F. A. Garrett
By [signature]
Atty.

Patented Nov. 29, 1932

1,889,470

UNITED STATES PATENT OFFICE

FRANCIS ALBERT GARRETT, OF IPSWICH, ENGLAND, ASSIGNOR TO RANSOMES, SIMS & JEFFERIES, LIMITED, OF ORWELL WORKS, IPSWICH, ENGLAND

UNIVERSAL JOINT

Original application filed July 30, 1930, Serial No. 471,780, and in Great Britain August 29, 1929. Divided and this application filed June 15, 1931. Serial No. 544,603.

The invention relates to universal joints for cardan and other shafts and more particularly to a joint of the type having a torque ring, with four radial projections or cross pins, arranged to form a reservoir for a lubricant which is fed under centrifugal action to the bearings of the cross pins, through channels in the cross pins, being a division of application #471,780, filed July 30, 1930.

Under ordinary circumstances, the speed at which the torque ring rotates would determine the amount of oil to be fed to the bearings, and so at very high speeds, the bearings would become flooded with lubricant owing to the great centrifugal forces set up.

The objects of the present invention are to avoid all the above-mentioned disadvantages by causing the oil to pass in small doses to the bearings under the control of a valve which is unaffected by centrifugal forces, and to provide suitable means to prevent the creation of a partial vacuum in the reservoir and the ingress of grit and other harmful matter into the bearings, and to provide a joint which is both light and strong.

With the above objects in view, the invention consists in the novel construction and combination of parts substantially as hereinafter described and more particularly defined by the appended claims, it being understood that such changes in the precise embodiments of the herein disclosed invention may be made as come within the scope of the claims.

In the accompanying drawings, wherein similar reference numerals indicate corresponding parts throughout the figures.

Figure 1:
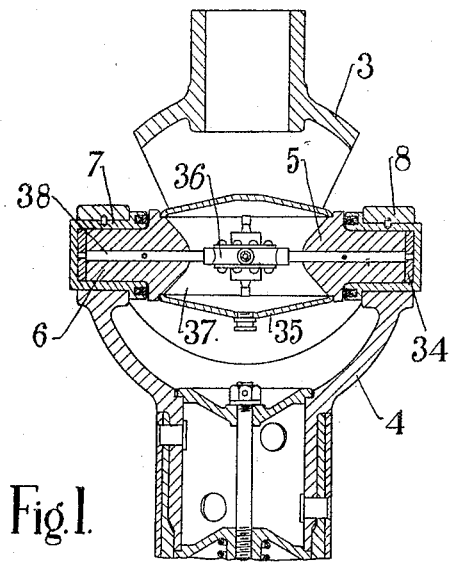
Figure 1 is a sectional elevation through a complete universal joint.

Referring to Figure 1 of the accompanying drawings, a torque ring 5 has four radial projections or cross-pins 6 which are journalled in bushes 7 firmly secured in bearings in the forks 3 and 4 by means of the caps 8.

The torque ring 5 is closed by plates 35 to form an oil reservoir 37 in which is situated a valve box 36.

The valve box 36 is connected by four radial oil feed pipes 38 to the ends of the cross pins 6. Hardened steel discs 34 are inserted between the ends of the cross-pins and the ends of the cup like bushes 7.

Figure 3:
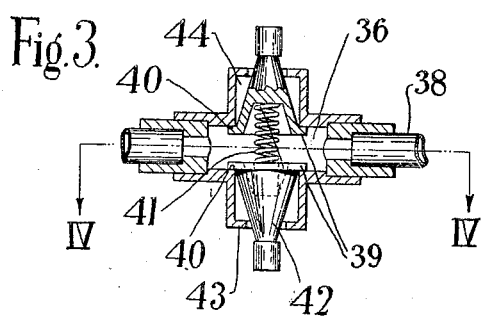
Figure 3 is a sectional elevation of one form of dosing valve on the line III—III, Figure 4.
Figure 4:
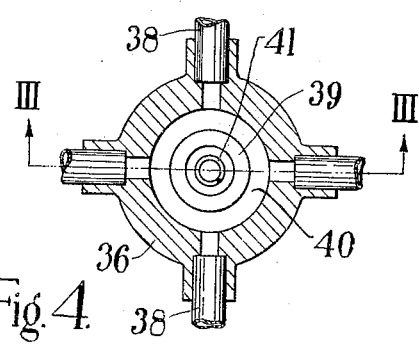
Figure 4 is a section on the line IV—IV, Figure 3.

The passage of oil to the cross-pin bearings is controlled by a suitable dosing valve, one form of which is shown in Figures 3 and 4.

The valve box 36 has two conical check valves 39 held normally to the valve seats 40 by a light spring 41.

The check valves are adapted to permit of only a very restricted passage of oil. In order that the oil shall only pass at intervals, or in small doses, the valves are adapted to be opened and closed intermittently during the rotation of the universal joint. The vibrations set up due to angular transverse oscillations of the torque ring 5 are utilized for this purpose, for example, each valve 39 has a relatively large spigot 42 arranged on or parallel to the rotary geometrical axis of the joint, that is, to the centre line of the torque ring 5, but to one side of the centre lines or axes of the cross-pins 6. Each valve seat 40 has a central flanged extension 43 surrounding the corresponding valve spigot 42 so as to leave a restricted oil passage 44 when the valve is open.

The valves vibrate intermittently under their inertia when the torque ring 5 oscillates, so that oil passes in small doses.

Figure 5:
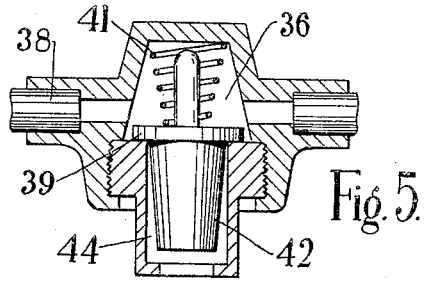
Figure 5 is a sectional elevation corresponding to Figure 3 of an alternative form of dosing valve.

A valve box with a single check valve 39, as shown in Figure 5, may be used.

Figure 6:
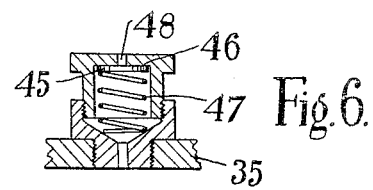
Figures 6 and 7 are sectional elevations showing two forms of anti-vacuum valve.
Figure 7:
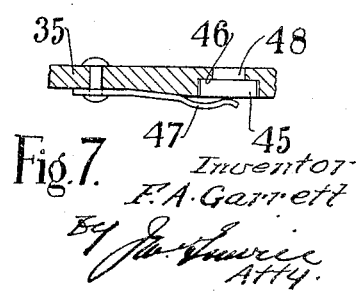
Figure 8:
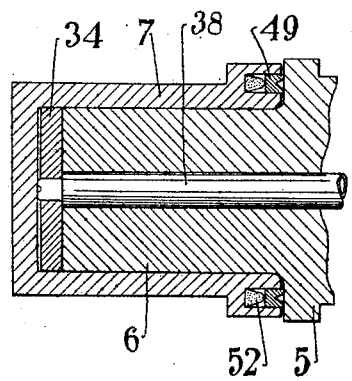
Figure 8 is a sectional elevation showing the bearing bush of one of the cross-pins.

In order to ensure adequate feeding of oil from the reservoir 37 and to avoid a tendency for dirt or water being drawn past the cross-pins 6, means are provided to admit air to the reservoir so as to prevent the formation of a vacuum. Suitable means are shown in Figures 6 and 7. In Figure 6, an antivacuum valve is shown in the form of a disc 45 held to its seat 46 by a spring 47 to close an air inlet-hole 48, the spring yielding and allowing the disc to move slightly off the seat 46 when the pressure of the atmosphere is sufficiently greater than the pressure in the reservoir. In Figure 7, the air inlet-hole 48 is controlled by a disc 45 held to its seat 46 by a leaf spring 47.

Figure 10:
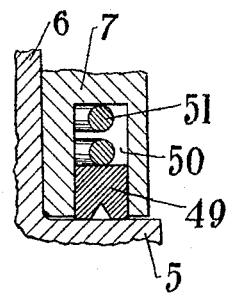
Figures 9 and 10 are sectional views of two forms of packing rings for the cross-pins bearings.
Figure 9:
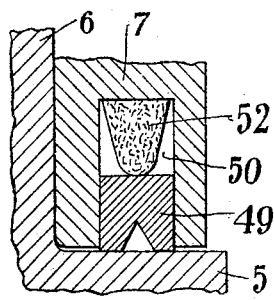
Figure 11:
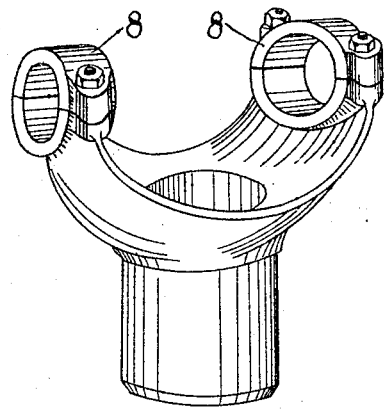
Figure 11 is a perspective view of one fork.

In order to avoid leakage of oil out of the cups 7 and to prevent dirt or water entering, the bearing cups are provided with packing rings 49 between them and the adjacent surfaces of the torque rings 5. These are inserted in grooves 50 and may be held in position by springs 51, as indicated in Figure 10, or by rubber or other resilient packing rings 52, as indicated in Figure 9. The packing rings 49 may be of graphite carbon, or a suitable metal such as cast iron, which is self-lubricating, that is to say, will not seize or result in undue friction in the event of the rubbing surfaces becoming dry. The packing rings 49 are normally lubricated by the oil between the pins 6 and the bearing cups 7.

Figure 2:
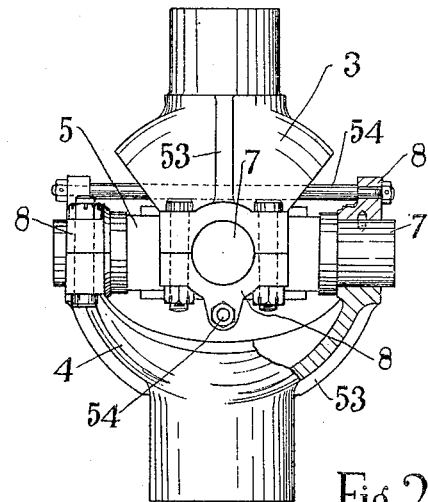
Figure 2 is an outside elevation of a complete universal joint.

The forks 3 and 4 of the universal joints are preferably of partial spherical form, as indicated, to ensure strength with lightness in construction. That is, both their inner and outer surfaces are spherical. They may be further strengthened by ribs 53, as shown in Figure 2, and further may be cross-tied by tie-bolts 54 to prevent them springing apart under excessive shock or stress when the cardan shaft is used on a vehicle running on rough roads.

I claim:

1. A universal joint comprising a torque ring, a valve box carried by the torque ring, a check valve in said box, and a closing spring for said valve, said valve being adapted under oscillation of said torque ring to open and to close intermittently to control the passage of oil into said box, substantially as and for the purpose hereinbefore set forth.

2. A universal joint including a torque ring, an oil reservoir in said torque ring, a valve for controlling communication between said oil reservoir and the joint members, said valve being arranged on the axis of the ring and adapted to be opened by the oscillations of the ring in the operation of the joint, and a cowl surrounding the valve and providing for the isolation of a small quantity of oil from the oil reservoir prior to the opening of the valve.

3. A universal joint including a torque ring, an oil reservoir in said torque ring, an oil supply surrounding the torque ring, a valve arranged in the axis of the torque ring to establish communication between the reservoir and the oil supply, said valve including a tapered spigot of sufficient weight to possess appreciable inertia, and a cowl surrounding the spigot and at all times open to the oil supply to isolate a small quantity of oil within the cowl from the oil supply prior to the opening of the valve for the admission of such oil to the reservoir, the weight of the spigot tending to so increase the inertia of the valve as to thereby provide material resistance to an alteration in the direction of rotation of the valve axis in correspondence with the oscillating torque ring.

In testimony whereof I have signed my name to this specification.

FRANCIS ALBERT GARRETT.